US011898523B1

(12) United States Patent
Mason et al.

(10) Patent No.: US 11,898,523 B1
(45) Date of Patent: Feb. 13, 2024

(54) FILTER HOUSING FOR A FUEL FILTER

(71) Applicant: Robert Bosch GmbH, Stuttgart (DE)

(72) Inventors: Paul Mason, Dearborn, MI (US); Alberto Levi Rossano Ruiz, Barrio Santiaguito (MX); David Toutant, Grosse Pointe Woods, MI (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/882,299

(22) Filed: Aug. 5, 2022

(51) Int. Cl.

| | |
|---|---|
| ***F02M 37/36*** | (2019.01) |
| ***F02M 37/10*** | (2006.01) |
| ***F02M 37/00*** | (2006.01) |
| ***F02M 37/44*** | (2019.01) |

(52) U.S. Cl.
CPC ........ *F02M 37/36* (2019.01); *F02M 37/0052* (2013.01); *F02M 37/10* (2013.01); *F02M 37/44* (2019.01)

(58) Field of Classification Search
CPC ........ F02M 37/32; F02M 37/34; F02M 37/36; F02M 37/44; F02M 37/46; F02M 37/0052
See application file for complete search history.

(56) References Cited

U.S. PATENT DOCUMENTS

| | | | | | |
|---|---|---|---|---|---|
| 5,647,329 | A * | 7/1997 | Bucci | F02M 37/50 | 123/509 |
| 5,809,975 | A * | 9/1998 | Tuckey | F02M 37/20 | 123/514 |
| 6,155,238 | A * | 12/2000 | Briggs | F02M 37/50 | 123/457 |
| 2010/0202898 | A1* | 8/2010 | Mason | F04F 5/463 | 417/151 |
| 2011/0297260 | A1* | 12/2011 | Mason | F04F 5/10 | 137/565.29 |
| 2017/0241386 | A1* | 8/2017 | Mason | F02M 37/14 | |

* cited by examiner

*Primary Examiner* — John Kwon
(74) *Attorney, Agent, or Firm* — Kelly McGlashen; Maginot, Moore & Beck LLC

(57) ABSTRACT

A fuel system that provides fuel to an internal combustion engine includes a fuel tank and a fuel pump configured to receive fluid from the fuel tank and supply pressurized fluid to the engine via a fuel filter. The filter receives fuel from the pump and provides filtered fuel to the engine. The filter is disposed in a filter chamber of a filter housing. The filter housing includes a fuel inlet that directs fuel received from the fuel pump into the filter chamber, a fuel outlet that directs filtered fuel received from the fuel filter to the fuel supply line, and a bypass outlet that directs fuel not drawn into the fuel filter by the internal combustion engine to a fuel pressure regulator. The regulator receives the unfiltered fuel from the bypass outlet and returns the unfiltered fuel to the fuel tank.

11 Claims, 3 Drawing Sheets

FILTER HOUSING FOR A FUEL FILTER

BACKGROUND

Fuel supplied to an internal combustion engine is typically filtered to remove particulates and debris. In certain applications, such as in a fuel system for a motorcycle, packaging space within the vehicle is limited. In such cases, compact fuel filters may be used to provide filtered fuel to the internal combustion engine. However, in some cases, compact fuel filters may have a reduced capacity as compared to some conventional fuel filters. The reduced capacity may be due to a relatively reduced overall filter size and/or increased flow rate through the filter. The flow rate through the filter may be increased since smaller filters have smaller volumes and because the reduced filter must pass the same amount of fuel as a conventionally-sized filter. In order to pass the same amount of fuel through a smaller volume, the rate of flow through the smaller volume is increased. Since pressure drop through the filter is directly related to flow rate, an increase in flow rate results in an increase in pressure drop. In some cases, the pressure drop is sufficient to adversely affect engine performance. Thus, it is desirable to provide a compact filter that provides fuel to the internal combustion engine at the required pressure.

SUMMARY

In some aspects, a filter housing for a fuel system is provided that is configured to receive a relatively compact fuel filter. The filter housing includes a filter chamber that receives the fuel filter. The filter housing includes an inlet port that communicates with the filter chamber and directs fuel into the fuel chamber, an outlet port that communicates with the filter chamber and discharges filtered fuel to an internal combustion engine and a bypass port that communicates with the filter chamber and permits unfiltered fuel to bypass the filter and be returned to the fuel tank via a pressure regulator. In particular, the bypass port is disposed in the filter housing between the inlet port and the fuel filter.

In the fuel system, a fuel pump pressurizes fuel drawn from the fuel tank and directs the pressurized fuel to the inlet of the filter housing. The internal combustion engine draws an amount of fuel from the outlet port that is sufficient for the engine's operating conditions. Fuel in excess of the amount of fuel drawn to the internal combustion engine exits the filter housing via the bypass port. Since the bypass port is disposed in the filter housing between the inlet port and the fuel filter, the excess fuel does not pass through the filter and exits the filter housing in an unfiltered state. The bypass port directs the unfiltered fuel to the pressure regulator, which in turn returns the fuel to the fuel tank via a return line.

Advantageously, a filter housing having the above-described bypass port includes a compact filter and has reduced pressure drop by reducing the flow rate through the fuel filter. This is achieved by directing fuel delivered to the filter housing and not required by the internal combustion engine (e.g., excess flow) to bypass the filter. In particular, the filter housing is configured so that the excess flow bypasses the fuel filter and goes directly to the pressure regulator. This places the pressure regulator on "the dirty" side of the filter. The fuel flow through the filter is variable, depends on the requirements of the engine, and is less than that delivered to the filter housing by the fuel pump. Thus, the fuel flow through the filter will be less than would occur through a compact filter disposed in a filter housing that omits the bypass port. This can be compared to some conventional filter housings in which one hundred percent of the output of the fuel pump passes through the fuel filter. By design, the flow in a conventional filter housing typically exceeds engine consumption, and excess filtered fuel within the conventional filter housing is directed to the fuel tank via the fuel regulator. In other words, the fuel regulator in a conventional fuel delivery system is typically on "the clean" side of the filter.

In some aspects, a fuel system includes an internal combustion engine, a fuel tank that is connected to the internal combustion engine via a fuel supply line and a fuel pump configured to receive fluid from the fuel tank and supply pressurized fluid to the fuel supply line via a fuel filter. The fuel system includes the fuel filter which is configured to receive fuel from the fuel pump and provide filtered fuel to the fuel supply line. The fuel filter is disposed in a filter housing. The filter housing includes a filter chamber, and the fuel filter is disposed in the filter chamber. The filter housing includes a fuel inlet that communicates with the filter chamber and directs fuel received from the fuel pump into the filter chamber, a fuel outlet that communicates with the filter chamber and directs filtered fuel received from the fuel filter to the fuel supply line, and a bypass outlet that communicates with the filter chamber. The bypass outlet directs fuel not drawn into the fuel filter by the internal combustion engine to a fuel pressure regulator. The fuel system also includes the fuel pressure regulator which is configured to receive fuel from the bypass outlet and return the fuel received from the bypass outlet to the fuel tank.

In some embodiments, the fuel received by the pressure regulator is not filtered by the fuel filter.

In some embodiments, the amount of fuel that passes through the fuel filter depends on the operating conditions of the internal combustion engine.

In some embodiments, the amount of fuel that passes through the fuel filter and is supplied to the internal combustion engine meets, but does not exceed, the operating requirements of the internal combustion engine.

In some embodiments, the amount of fuel that passes through the pressure regulator corresponds to the difference in the amount of fuel provided by the fuel pump and the amount of fuel required by the internal combustion engine.

In some embodiments, the bypass outlet is disposed in the filter chamber at a location between the fuel inlet and the fuel filter.

In some embodiments, the fuel pump, the filter housing and the fuel pressure regulator are disposed in the fuel tank.

In some embodiments, the filter chamber is cylindrical, the fuel inlet extends along an axis that is perpendicular to an axis of symmetry of the filter chamber, the fuel outlet extends along an axis that is coaxial with the axis of symmetry of the filter chamber, and the bypass outlet extends along an axis that is parallel to the axis of symmetry of the filter chamber.

In some aspects, a fuel filter is provided for filtering fuel from a fuel pump that supplies fuel to an internal combustion engine. The fuel filter includes filter element and a filter housing. The filter housing includes a filter chamber. The filter element is disposed in the filter chamber. The filter housing includes a fuel inlet that communicates with the filter chamber and directs fuel received from the fuel pump into the filter chamber. The filter housing includes a fuel outlet that communicates with the filter chamber and directs filtered fuel received from the filter element to the internal combustion engine. In addition, the filter housing includes a bypass outlet that communicates with the filter chamber, the bypass outlet receiving fuel not drawn into the fuel filter and directing it away from the internal combustion engine.

In some embodiments, the bypass outlet is disposed in the filter chamber at a location between the fuel inlet and the fuel filter.

In some embodiments, the filter chamber is cylindrical, the fuel inlet extends along an axis that is perpendicular to an axis of symmetry of the filter chamber, the fuel outlet extends along an axis that is coaxial with the axis of symmetry of the filter chamber, and the bypass outlet extends along an axis that is parallel to the axis of symmetry of the filter chamber.

In some aspects, a fuel system supplies fuel from a fuel tank to an internal combustion engine. The fuel system is configured to direct fuel that is output from a fuel pump and required by the internal combustion engine through a fuel filter prior to ingestion by the internal combustion engine, and direct fuel that is output from the fuel pump and is in excess of the fuel required by the internal combustion engine to the fuel tank via a path that bypasses the fuel filter.

DETAILED DESCRIPTION

Figure 1:
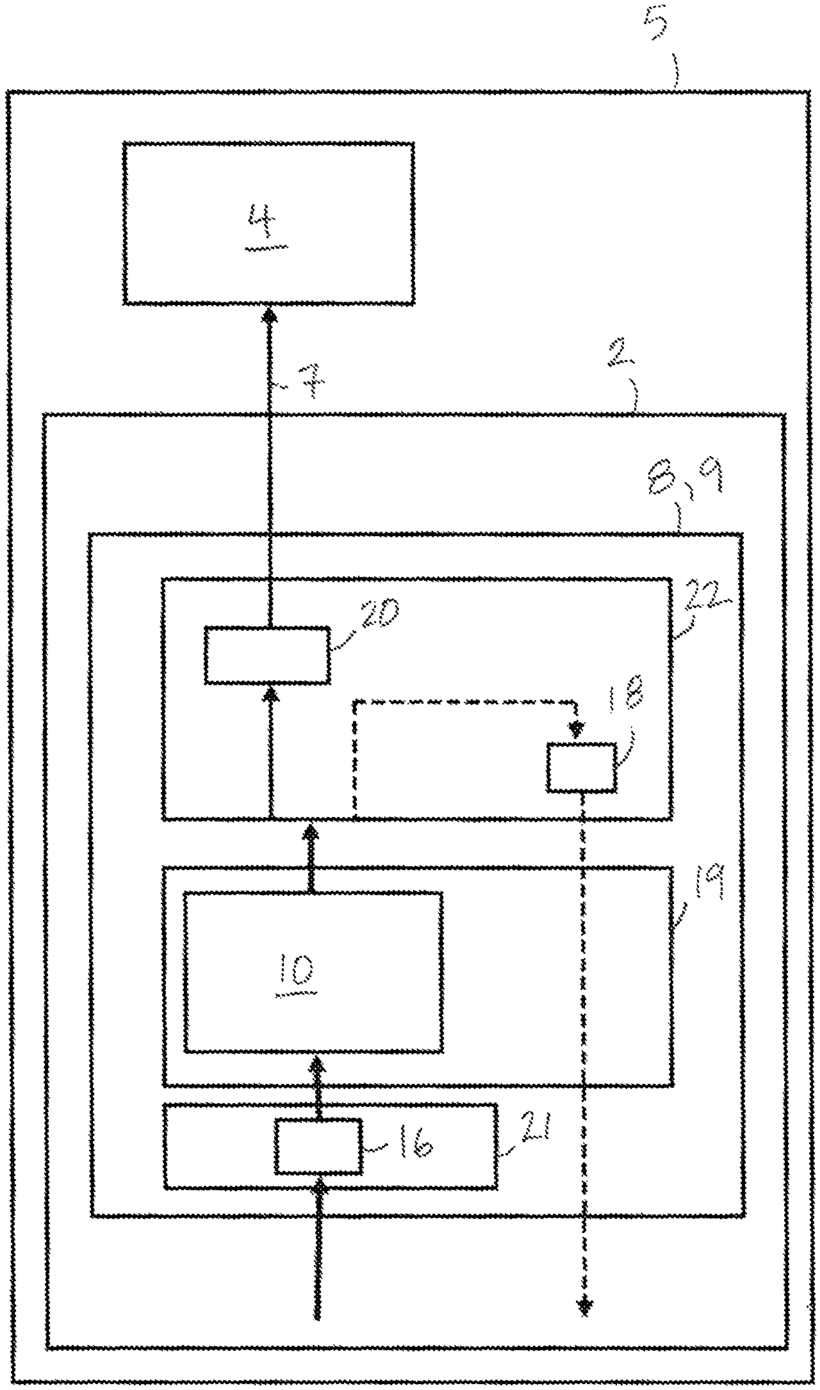
FIG. 1 is a schematic diagram of a fuel system that includes a fuel tank assembly.
Figure 2:
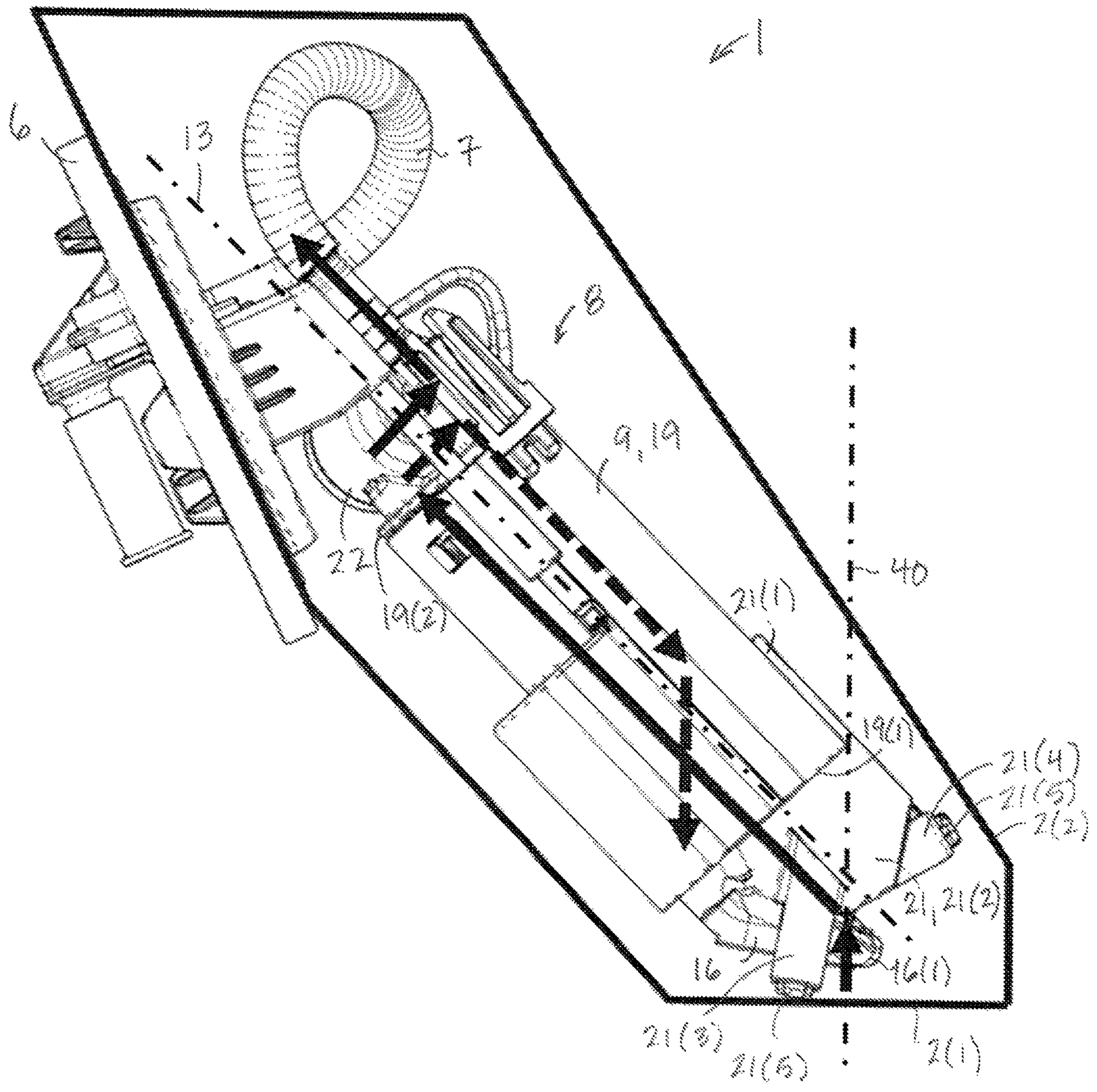
FIG. 2 is a schematic illustration of the fuel tank assembly of FIG. 1.

Referring to FIGS. 1 and 2, a fuel system 5 for supplying fuel to an internal combustion engine 4 of a vehicle (not shown) includes a fuel tank assembly 1 and a fuel line that delivers fuel from the fuel tank assembly 1 to the internal combustion engine 4. In some embodiments, the vehicle may be, but is not limited to, a saddle-type vehicle such as a motorcycle, a jet-ski or a four-wheeled all-terrain vehicle. The fuel tank assembly 1 of such vehicles may be small relative to those of automobiles, buses, trucks, etcetera, and thus packaging requirements for elements of the fuel tank assembly 1 may be stringent. The fuel tank assembly includes a fuel tank 2, and a fuel module 8 that is disposed within the fuel tank 2. The fuel tank 2 is mounted to the vehicle and is an irregularly shaped container. The fuel module 8 is inserted into the fuel tank 2 through an opening 3 in the tank. As used herein, terms describing relative position such as "top", "bottom", "upper", "lower", "above" and "below" are used with reference to the fuel tank 2 as oriented for normal operation, as shown in FIG. 2.

The fuel module 8 includes a fuel pump 10, and a fuel pressure regulator 18 that regulates the fuel pressure of fuel discharged from the fuel pump 10. The fuel module 8 includes a coarse filter 16 that filters fuel before it enters the fuel pump 10, and a fine filter 20 that filters fuel as it exits the fuel pump 10. In addition, the fuel module 8 includes a module housing 9 that houses and support the fuel pump 10, the fuel pressure regulator 18 and the filters 16, 20 within the fuel tank 2. The module housing 9 is located within the fuel tank 2 by a flanged member 6. The flanged member 6 is generally disk shaped and overlies the fuel tank opening 3. The flanged member 6 seals the opening 3 and allows for electrical and hydraulic connections to be made with structures within the fuel tank 2, including the fuel pressure regulator 18 and the fuel pump The module housing 9 is supported within the fuel tank 2 via the flanged member 6. The module housing 9 is an assembly of three housing elements, including a fuel pump holder 19 that supports the fuel pump 10, a module locator 21 that is disposed on a first end 19(1) of the fuel pump holder 19 and locates the fuel module 8 relative to a bottom surface of the fuel tank 2, and a filter housing 22. The filter housing 22 is disposed on a second end 19(2) of the fuel pump holder 19 and supports the fine filter 20 (sometimes also referred to as "the filter element") and fuel pressure regulator 18.

The coarse filter 16 is an elongate structure that includes an inner portion (not shown) that is disposed in the fuel pump holder 19, and a protruding portion 16(1) that protrudes out of the pump holder 19. The protruding portion 16(1) is angled relative to the inner portion in such a way that the protruding portion 16(1) is angled toward the longitudinal axis 13 of the fuel pump and overlies the fuel pump inlet. The coarse filter 16 is a wicking filter that is configured to draw fuel throughout the area encompassed by the coarse filter.

The module locator 21 includes a short, cylindrical, open-ended sleeve portion 21(1) that receives the first end 19(1) of the fuel pump holder 19. The sleeve portion 21(1) includes a cut-out (not shown) that overlies the fuel pump inlet, allowing the fuel inlet unobstructed access to fuel disposed in the bottom of the fuel tank 2.

The module locator 21 also includes a footed portion 21(2) that is disposed on the lower end of the sleeve portion 21(1), and includes two pairs 21(3), 21(4) of protruding feet. The first pair 21(3) of feet protrude outward from the footed portion 21(2) so as to rest on a bottom surface 2(1) of the fuel tank 2, while a second pair 21(4) of the feet protrude outward from the footed portion 21(2) in a second direction so as to rest on a side surface 2(2) of the fuel tank 2, whereby the module locator 21 stabilizes and locates the fuel module 8 relative to an inner surface of the fuel tank 2. Each foot comprises a tube having a diameter that is much smaller than a diameter of the sleeve portion 21(1), and each tube terminates in a resilient pad 21(5).

The orientation in space of the fuel tank 2 and fuel module 8 as illustrated in FIG. 2 corresponds to a "normal" operating orientation, such as occurs when the vehicle is operated on a horizontal surface with all wheels in contact with the horizontal surface. In this orientation, the pump outlet end (not shown) and the fuel pump holder second end 19(2) are above the pump inlet end (not shown) and the fuel pump holder first end 19(1). In this orientation, the fuel pump holder first end 19(1) is supported on a bottom surface 2(1) of the fuel tank 2 via the module locator 21. In addition, a longitudinal axis 13 of the fuel pump 10 is acutely angled relative to a vertical axis 40. As used herein, the term "horizontal" refers to a line that is perpendicular to the direction of gravity and the term "vertical" refers to a line that is parallel to the direction of gravity. When the fuel module 8 is used in the normal operating orientation, fuel pools at the bottom surface 2(1) of the fuel tank 2 and is drawn through the coarse filter 16 into the fuel pump 10 via the fuel pump inlet. Pressurized fuel exits the fuel pump 10 via the fuel pump outlet and is directed to the filter housing 22 which houses the fine filter 20 and supports the fuel pressure regulator 18.

In the illustrated embodiment, the fuel pump 10 is a turbine fuel pump with an electric motor. The fuel pump 10 is a generally cylindrical device-and the longitudinal axis 13 of the fuel pump 10 extends between the pump holder first and second ends 19(1), 19(2). The fuel pump 10 intakes fuel via a pump inlet (not shown) disposed at the first end 19(1) of the pump holder 19 and discharges pressurized fuel from a pump outlet (not shown) disposed at the second end 19(2) of the pump holder 19. The pump outlet is directly connected to an inlet 24 of the filter housing 22.

Figure 3:
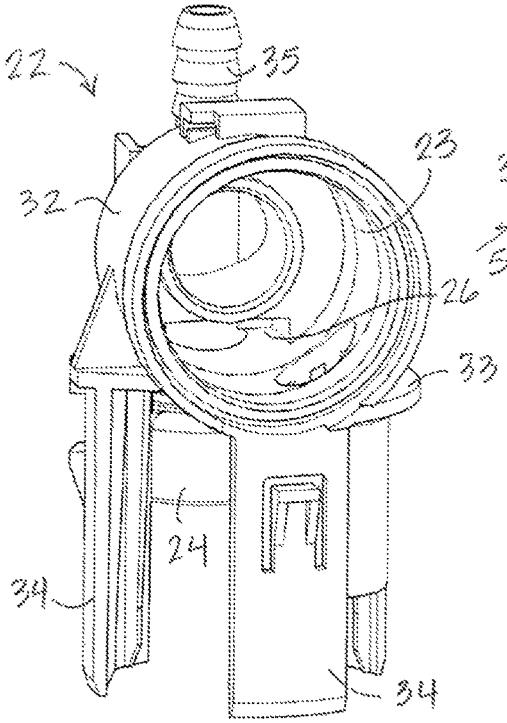
FIG. 3 is a rear perspective view of a filter housing included in the fuel tank assembly.
Figure 4:
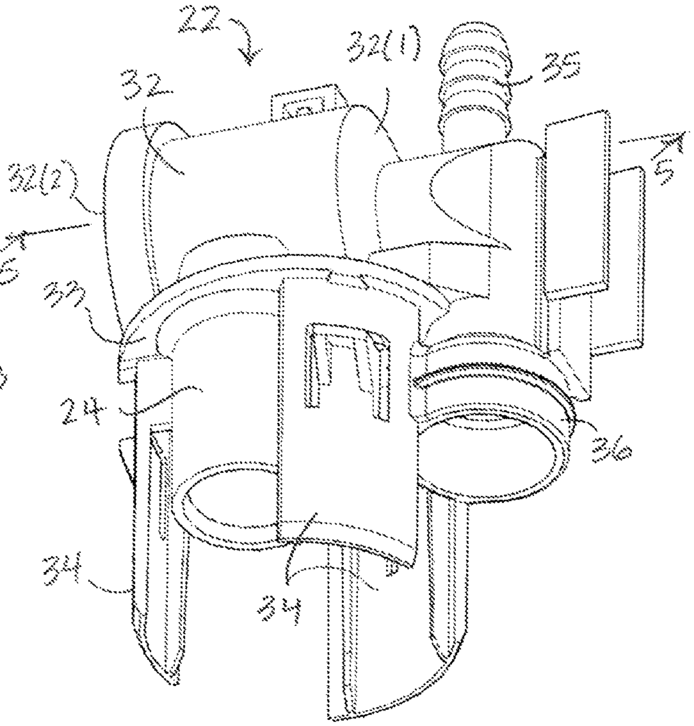
FIG. 4 is a side perspective view of the filter housing of FIG. 3.
Figure 5:
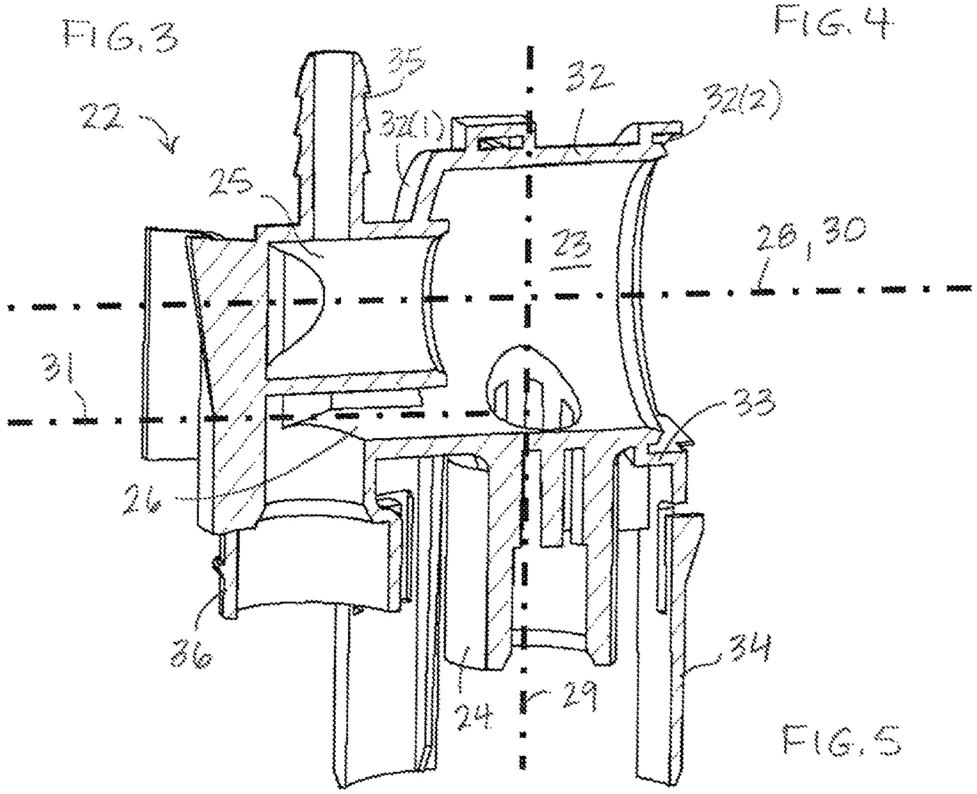
FIG. 5 is a cross sectional view of the filter housing as seen along line 5-5 of FIG. 4.

Referring to FIGS. 3-5, the filter housing 22 includes a hollow cylindrical portion 32. An inner surface of the cylindrical portion 32 defines a filter chamber 23 that receives the fine filter 20. The filter chamber 20 has rotational symmetry about a filter chamber axis 28.

The filter housing 22 includes cap plate 33 that is integral with an outer surface of the filter chamber 23 so as to be disposed between the filter chamber 23 and the fuel pump holder 19. In the illustrated embodiment, the cap plate 33 closes the second end 19(2) of the fuel pump holder 19. The filter housing 22 includes latching guide members 34 that protrude from the cap plate 33 in a direction away from the filter chamber 23 and perpendicular to the filter chamber axis 28. The latching guide members are received in the fuel pump holder 19 and are configured to engage with an inner surface of the fuel pump holder 19, whereby the filter housing 22 is retained on the fuel pump holder second end 19(2).

The filter housing 22 includes a fuel inlet 24 that communicates with the filter chamber 23 and directs fuel received from the fuel pump 10 into the filter chamber 23. The fuel inlet 24 extends through the cap plate 33 and is concentric with an inlet axis 29 that is perpendicular to, and non-intersecting with, the filter chamber axis 28.

The filter housing 22 includes a fuel outlet 25 that communicates with the filter chamber 23 and directs filtered fuel received from the fine filter 20 to the fuel supply line 7 via a hose connection stem 35. The fuel outlet 25 protrudes outward from a first end 32(1) of the cylindrical portion 32 and has an outlet axis 30 that is concentric with the filter chamber axis 28. The hose connection stem 35 protrudes from a sidewall of the fuel outlet 25 and is a hollow tube having external surface features that are configured to engage and retain the fuel supply line 7. Although the second end 32(2) of the cylindrical portion 32 is illustrated as being open in FIGS. 3-5, the second end 32(2) is closed by an endcap (not shown).

The filter housing 22 includes a bypass outlet 26 that communicates with the filter chamber 23, the bypass outlet 26 directing fuel not drawn into the fine filter 20 by the internal combustion engine 4 to the fuel pressure regulator 18. The bypass outlet 26 is located within the filter housing 22 between the fuel inlet 24 and the filter chamber 23. By this configuration, it is possible for fuel to enter the bypass outlet 26 without passing through the fine filter 20. The bypass outlet 26 protrudes outward from the cylindrical portion first end 32(1) and has an bypass outlet axis 30 that is parallel to, and offset from, the filter chamber axis 28. More specifically, the bypass outlet axis 30 is disposed between the filter chamber axis 28 (and thus also the outlet axis 30) and the cap plate 33. The bypass outlet 26 terminates in a collar 36 that receives and supports the fuel pressure regulator 18. Thus, the bypass outlet 26 provides a passageway that bypasses the fine filter 20 and allows unfiltered fuel received in the filter housing 22 from the fuel pump 10 to flow to the fuel pressure regulator 18.

The fuel pressure regulator 18 is mounted on the collar 36 so as to communicate with the bypass outlet 26 and regulates the pressure of the high pressure fuel discharged from the fuel pump 10. In addition, excess fuel (e.g., fuel not required by the engine) is returned to the fuel tank 2 via a fuel return passageway (not shown) provided in the fuel pump holder 19 after passing through the fuel pressure regulator 18, as discussed further below. The fuel received by the fuel pressure regulator 18 is not filtered by the fine filter 20.

In the fuel module 8, the internal combustion engine 4 draws fuel from fuel outlet 25 of the filter housing 22. More particularly, in use, the internal combustion engine 4 only receives an amount of fuel from the fuel filter housing 22 that is sufficient to meet its current operating requirements. Thus, the amount of fuel that passes through the fine filter 20 at any given time depends on the operating conditions of the internal combustion engine 4. In addition, the amount of fuel that passes through the fine filter 20 and is supplied to the internal combustion engine 4 meets, but does not exceed, the operating requirements of the internal combustion engine at the given time. On the other hand, the amount of fuel that passes through the bypass outlet 26 and is directed to the fuel pressure regulator 18 corresponds to the difference in the amount of fuel provided by the fuel pump 10 and the amount of fuel required by the internal combustion engine 4 at the given time.

Thus, in the fuel system 5, the fuel module 8 includes a filter housing 22 that is configured to direct fuel that is output from the fuel pump 10 and is required by the internal combustion engine 4 through the fine filter 20 prior to ingestion by the internal combustion engine 4 and direct fuel that is output from the fuel pump 10 and is in excess of the fuel required by the internal combustion engine 4 to the fuel tank 2 via a path that bypasses the fine filter 20. This configuration reduces the rate of flow of fuel through the fine filter 20 as compared to some conventional filter housings. The reduction in flow rate of fuel reduces the pressure drop across the filter housing 22, which in turn increases filter capacity. By increasing filter capacity, a compact fine filter may be used in applications having stringent packaging requirements without adversely affecting engine performance.

In the illustrated embodiment, the fuel pump 10 is a turbine fuel pump with an electric motor. However, the fuel pump 10 is not limited to this type of fuel pump, and any appropriate type of fuel pump can be used.

Selective illustrative embodiments of the vehicle fuel tank assembly and fuel module including the filter housing are described above in some detail. It should be understood that only structures considered necessary for clarifying the vehicle fuel tank assembly, the fuel module and the filter housing have been described herein. Other conventional structures, and those of ancillary and auxiliary components of the vehicle fuel tank assembly are assumed to be known and understood by those skilled in the art. Moreover, while working examples of the vehicle fuel tank assembly, the fuel module and the filter housing have been described above, the vehicle fuel tank assembly and fuel system are not limited to the working examples described above, but various design alterations may be carried out without departing from the vehicle fuel tank assembly and fuel module as set forth in the claims.

We claim,:

1. A fuel system comprising:

an internal combustion engine;

a fuel tank that is connected to the internal combustion engine via a fuel supply line;

a fuel pump configured to receive fluid from the fuel tank and supply pressurized fluid to the fuel supply line via a fuel filter;

the fuel filter which is configured to receive fuel from the fuel pump and provide filtered fuel to the fuel supply line, the fuel filter disposed in a filter housing, the filter housing including a filter chamber, the fuel filter being disposed in the filter chamber, a fuel inlet that communicates with the filter chamber and directs fuel received from the fuel pump into the filter chamber, a fuel outlet that communicates with the filter chamber and directs filtered fuel received from the fuel filter to the fuel supply line, and a bypass outlet that communicates with the filter chamber, the bypass outlet directing fuel not drawn into the fuel filter by the internal combustion engine to a fuel pressure regulator; and the fuel pressure regulator which is configured to receive fuel from the bypass outlet and return the fuel received from the bypass outlet to the fuel tank.

2. The fuel system of claim 1, wherein the fuel received by the pressure regulator is not filtered by the fuel filter.

3. The fuel system of claim 1, wherein the amount of fuel that passes through the fuel filter depends on the operating conditions of the internal combustion engine.

4. The fuel system of claim 1, wherein the amount of fuel that passes through the fuel filter and is supplied to the internal combustion engine meets, but does not exceed, the operating requirements of the internal combustion engine.

5. The fuel system of claim 4, wherein the amount of fuel that passes through the pressure regulator corresponds to the difference in the amount of fuel provided by the fuel pump and the amount of fuel required by the internal combustion engine.

6. The fuel system of claim 1, wherein the bypass outlet is disposed in the filter chamber at a location between the fuel inlet and the fuel filter.

7. The fuel system of claim 1, wherein the fuel pump, the filter housing and the fuel pressure regulator are disposed in the fuel tank.

8. The fuel system of claim 1, wherein the filter chamber is cylindrical, the fuel inlet extends along an axis that is perpendicular to an axis of symmetry of the filter chamber, the fuel outlet extends along an axis that is coaxial with the axis of symmetry of the filter chamber, and the bypass outlet extends along an axis that is parallel to the axis of symmetry of the filter chamber.

9. A fuel filter for filtering fuel from a fuel pump that supplies fuel to an internal combustion engine, the fuel filter comprising:

a filter element; and a filter housing, the filter housing including a filter chamber, the filter element being disposed in the filter chamber, a fuel inlet that communicates with the filter chamber and directs fuel received from the fuel pump into the filter chamber, a fuel outlet that communicates with the filter chamber and directs filtered fuel received from the filter element to the internal combustion engine, and a bypass outlet that communicates with the filter chamber, the bypass outlet receiving fuel not drawn into the fuel filter and directing it away from the internal combustion engine.

10. The fuel filter of claim 9, wherein the bypass outlet is disposed in the filter chamber at a location between the fuel inlet and the fuel filter.

11. The fuel filter of claim 9, wherein the filter chamber is cylindrical, the fuel inlet extends along an axis that is perpendicular to an axis of symmetry of the filter chamber, the fuel outlet extends along an axis that is coaxial with the axis of symmetry of the filter chamber, and the bypass outlet extends along an axis that is parallel to the axis of symmetry of the filter chamber.

* * * * *